United States Patent
Denbar et al.

(10) Patent No.: US 6,490,591 B1
(45) Date of Patent: Dec. 3, 2002

(54) APPARATUS AND METHOD FOR STORING COMPLEX STRUCTURES BY CONVERSION OF ARRAYS TO STRINGS

(75) Inventors: Melissa Lee Denbar, Richmond, VA (US); Ryan Alan Danner, Richmond, VA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/524,921

(22) Filed: Mar. 13, 2000

(51) Int. Cl.[7] .............................................. G06F 17/00
(52) U.S. Cl. ...................................... 707/101; 707/102
(58) Field of Search ........................... 707/3, 4, 5, 101, 707/102, 10; 709/203, 223, 311; 382/187; 717/100, 107, 147; 711/202

(56) References Cited

U.S. PATENT DOCUMENTS 5,970,170 A * 10/1999 Kadashevich et al. ...... 382/179

OTHER PUBLICATIONS

Dave Winer, wysiwyg://60/http://www.xmlrpc.com/spec, copyrighted 1999.*

* cited by examiner

*Primary Examiner*—Diane D. Mizrahi
*Assistant Examiner*—Apu Mofiz
(74) *Attorney, Agent, or Firm*—Leon R Turkevich

(57) ABSTRACT

An executable process, configured for storing and retrieving data from a storage medium having a prescribed storage definition, is configured for converting an array having a prescribed data structure into a string having array descriptors that specify the prescribed data structure. The array descriptors are used to identify for each a element its corresponding element name and element value. The array descriptors also identify for each element its relative depth within the array, for example whether a given array element is a subelement of another array element. Hence, the array can be stored and recovered from the storage medium without modification of the prescribed storage definition and without loss of the data structure of the array.

44 Claims, 5 Drawing Sheets

APPARATUS AND METHOD FOR STORING COMPLEX STRUCTURES BY CONVERSION OF ARRAYS TO STRINGS

BACKGROUND OF THE INVENTION

1. Field of the Invention

The present invention relates to storage of a complex data structure such as an array within storage media having a defined structure, for example a database table or an extensible markup language (XML) document.

2. Description of the Related Arts

Storage of information within a storage medium requires establishment of a prescribed storage definition for the storage medium. The storage definition for the storage medium enables the information to be stored and retrieved from the storage medium according to prescribed routines based on the storage definition. Such storage definitions may include specifying a definition for a data entry, where the data entry includes a unique identifier usable by an index for searching (i.e., a key), and a corresponding data entry value. For example, a database such as an LDAP database has prescribed storage definitions that enable external processes to access the database. Similarly, an extensible markup language (XML) document may be defined by prescribed XML tags that specify the data to be stored.

FIG. 1 is a diagram illustrating a conventional XML document 10 configured for storing information according to a prescribed storage definition. The XML document 10 includes XML tags 12 that specify the storage definition for the information to be stored. For example, the XML tags 12a and 12e define the boundaries of the XML document 10 having the title "USER ENTRY". The XML tags 12b, 12c and 12d each specify a data entry having an element name 14 and the corresponding element value 16. Each XML tag 12 also specifies a prescribed data type 18. Hence, an XML parser can recognize that the data field "User Address" 14b is an address-type entry having a value of "1234 Generic Road, Anytown, Va. USA 23232". Hence, the XML document 10 provides a data structure that enables the storage and retrieval of information according to the prescribed storage definitions specified within the XML document 10 and as implied by the syntax of the XML language.

A fundamental problem with the storage of information within a rigidly defined storage medium, such as in an XML document or a database, is that the addition of a complex structure such as an array requires a change in the existing storage definition. For example, the data element "User Address" 14b specifies an address value of "1234 Generic Road, Anytown, Va. USA 23232". Assume, however, that a new use of the existing data structure 10 requires storage of the address value as a structured array 20, as illustrated in FIG. 2, where the address value 16b needs to be redefined as an array 22 having a plurality of separate array elements 24 instead of the single string 16b. In particular, the element 24a specifies the name ("User Address") of the array 22, and each of the elements 24b, 24c, 24d, 24e, and 24f specify an element name 26 usable as a key and a corresponding element value 28. Although the array 22 has the advantage of enabling indexed searching on any one of the elements 24, the array 22 cannot be stored within the XML document 10 according to conventional techniques. Hence, the array 22 cannot be stored without modification to the existing structure of the XML document 10 unless the element values 28 within the array 22 are extracted and combined to form the string 16b, resulting in a loss of the searchable element names 26.

SUMMARY OF THE INVENTION

There is a need for an arrangement that enables a complex data structure to be stored within a storage medium according to a prescribed storage definition, without modification of the prescribed storage definition or removal of structural components of the complex data structure.

There is also a need for an arrangement that enables an array having a prescribed data structure to be stored within a single data field having a prescribed storage definition in a manner that enables the array to be recovered from the single data field.

These and other needs are attained by the present invention, where an executable process, configured for storing and retrieving data from a storage medium having a prescribed storage definition, is configured for converting an array having a prescribed data structure into a string having array descriptors that specify the prescribed data structure, enabling the array to be stored and recovered from the storage medium without modification of the prescribed storage definition.

According to one aspect of the present invention, a method is provided in a executable system configured for storing information onto a tangible medium according to a prescribed storage definition. The method includes generating a string based on an array, having a prescribed data structure and having the information stored in the array according to the prescribed data structure, by including within the string the information and array descriptors that specify the prescribed data structure. The method also includes storing the string into a data field on the tangible medium according to the prescribed storage definition. The inclusion of array descriptors within the string and that specify the prescribed data structure enables the array structure to be preserved during storage into the data field according to the prescribed storage definition. Hence, a retrieval process may regenerate the array from the string stored in the data field, based on the stored array descriptors. Hence, a complex structure such as an array can be stored in a storage medium having a prescribed storage definition, without loss of the array structure or modification to the prescribed storage definition.

Another aspect of the present invention provides a processor-based system configured for storing information onto a tangible medium according to a prescribed storage definition. The system includes a storage interface process configured for converting an array, having a prescribed data structure and information stored according to the prescribed data structure, into a string including the information and array descriptors that specify the prescribed data structure. The system also includes a storage process configured for storing the string into a data field on the tangible medium according to the prescribed storage definition.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 3:
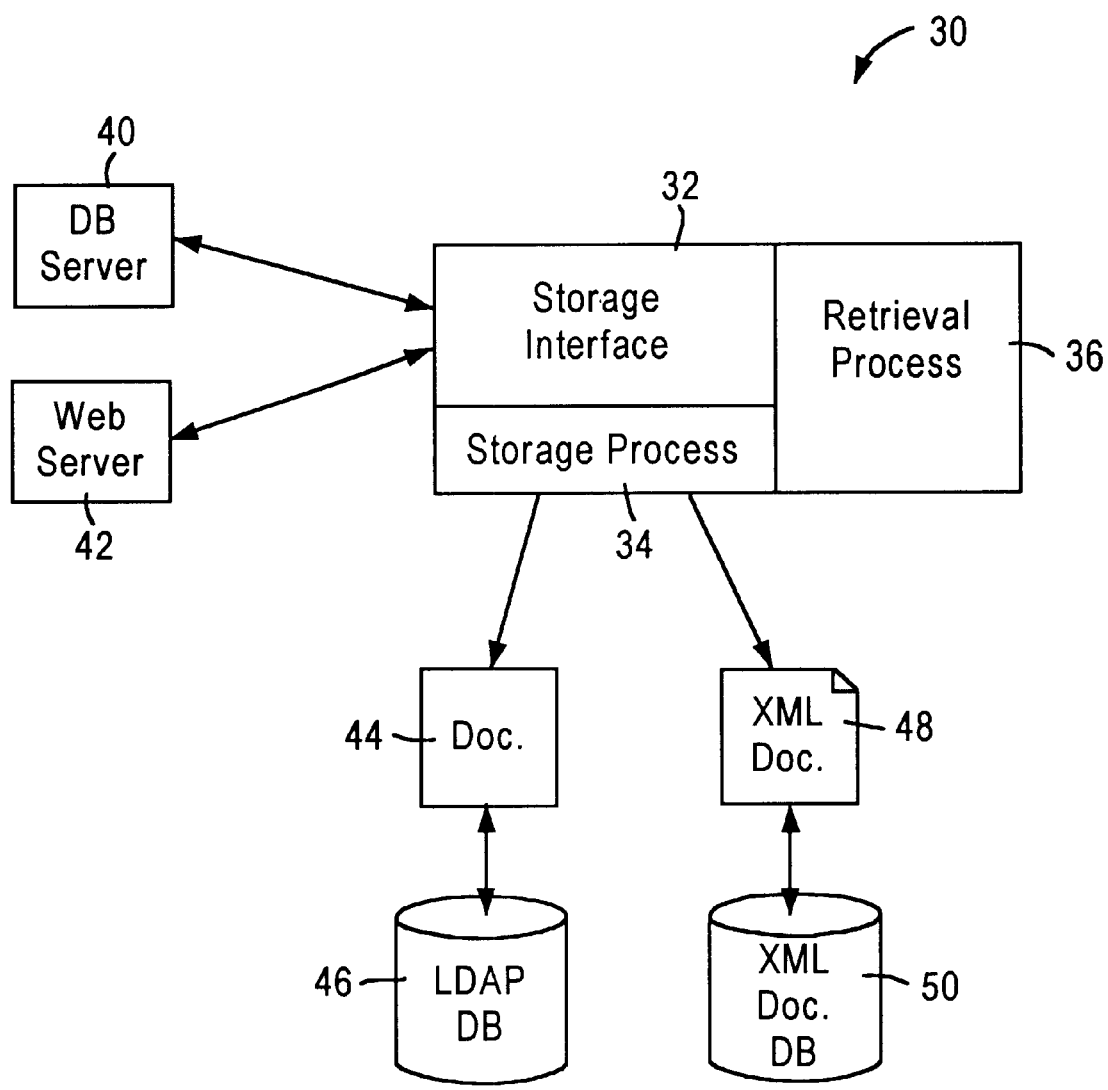
FIG. 3 is a block diagram illustrating a system for storing the structured array into a data field on a tangible medium having a prescribed storage definition according to an embodiment of the present invention.

FIG. 3 is a diagram of an executable system 30 configured for storing an array having a prescribed data structure into a data field on a tangible medium according to a prescribed storage definition according to an embodiment of the present invention. The system 30 includes a storage interface process 32, a storage process 34, and a retrieval process 36. The storage interface process 32 is configured for receiving an array from various data sources, for example a database server 40 configured for storing and managing the array as a prescribed data structure, or a Web server 42 configured for sending and receiving an HTML-based form between Web clients, wherein the data structure of the array is defined by the HTML form passed between the Web server 42 and the Web clients.

Figures 1, 2:
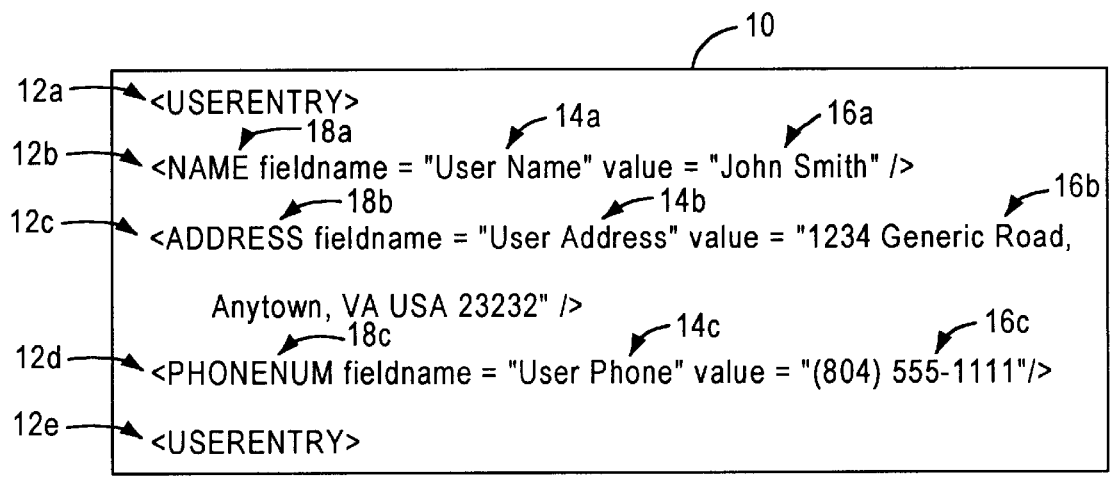
FIG. 1 is a diagram illustrating a conventional extensible markup language (XML) document for storing data according to prescribed XML storage definitions.
FIG. 2 is a diagram illustrating a structured array.

As described below, the storage interface process 32 is configured for receiving the array 20, illustrated in FIG. 2, and converting the array into an alphanumeric string that can be stored within a single data field according to a prescribed storage definition. For example, the single data field may be defined according to a storage definition that specifies a single forms-based field of a forms document 44 to be stored in a SQL-type database or a Lightweight Directory Access Protocol (LDAP) database 46. Alternately, the single data field may the defined according to XML tags within an XML document for storage within an XML document database 50.

Figure 4A:
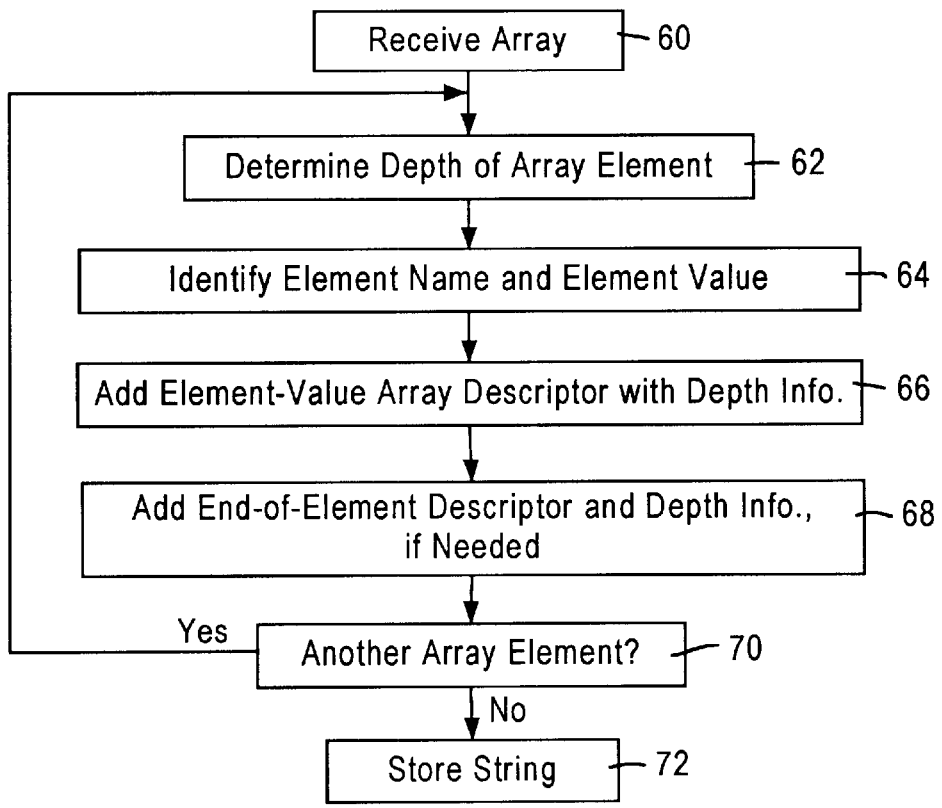
FIGS. 4A and 4B are diagrams illustrating the respective methods for storing the structured array into, and recovering the structured array from, the data field on the tangible medium having the prescribed storage definition according to an embodiment of the present invention.

FIG. 4A is a diagram illustrating the method of converting the array 20 into a string for storage into a data field according to a prescribed storage definition according to an embodiment of the present invention. The methods disclosed in FIGS. 4A and 4B may be implemented by a processor which executes instructions stored on a computer readable medium. Upon receiving the array 20 in step 60, the storage interface process 32 analyzes each array element 24 and determines the depth of the array element in step 62, for example if a given array element is a sub-element of another array element. The storage interface process 32 also identifies, for each array element 24, an element name 26 and a corresponding element value 28 in step 64.

Figure 5A:
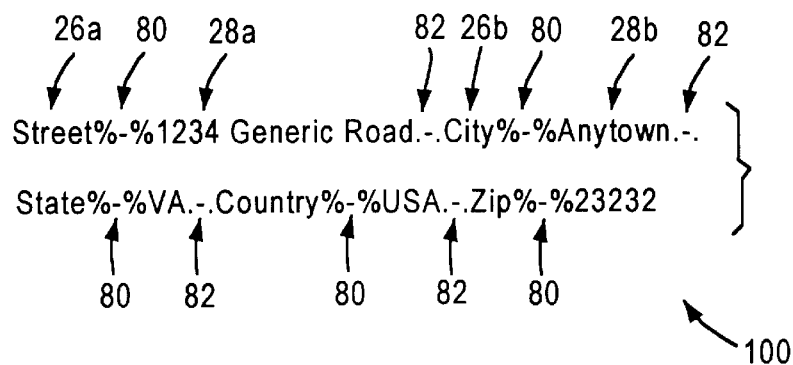
FIGS. 5A and 5B are diagrams illustrating a generated string having array descriptors that specify the prescribed data structure, and an XML document storing the string according to an embodiment of the present invention.

The storage interface process 32 then initiates generation of an alphanumeric string in step 66. In particular, the storage interface process 32 inserts in step 66 an element-value array descriptor 80, illustrated in FIG. 5A, between the element name 26 and the corresponding element value 28. For example, FIG. 5A illustrates that the storage interface process 32 begins the string 100 by inserting between the element name 26a (e.g., "Street") and the corresponding element value 28a (e.g., "1234 Generic Road") an element-value array descriptor 80 (e.g., "%-%"). Hence, the storage interface process 32 inserts the element-value array descriptor 80 to separate the element name 26 from the corresponding element value 28. As described below with respect to FIG. 6B, the storage interface 32 also provides depth information in the element-value array descriptor 80 by adding a prescribed number of dashes ("-") corresponding to the depth of the array.

Figure 5B:
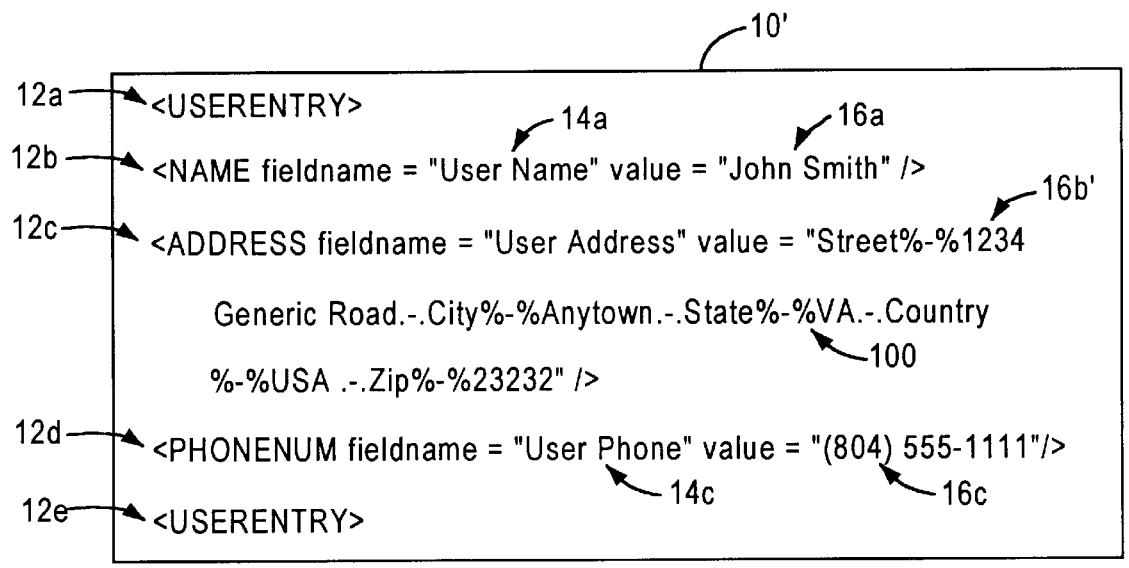

The storage interface process 32 then adds an end-of-element descriptor 82 in step 68 between each of the array elements. If necessary, the array descriptors may also include a depth indicator that specifies the depth of the array element, described below. If in step 70 there are no other array elements to process, the storage process 34 stores in step 72 the generated string 100 within the single field 16b', illustrated in the XML document 10' FIG. 5B.

Hence, the XML document 10' is able to store the contents of the array 22 as a string 100 according to the prescribed storage definitions established by the XML syntax and the XML tag 12c.

Moreover, the string 100 includes the array descriptors 80 and 82, enabling the retrieval process 36 to regenerate the array 22 from the string 100 upon parsing the XML document 10', described below. Consequently, the disclosed system 30 enables complex structured arrays 22 to be stored within an existing storage framework, such as an XML document, without modification of the XML document structure or any loss of the data structure 22. The ability to store complex structured arrays 22 within predefined XML documents may be particularly effective in applications such involving storage of user attributes or application state within XML documents, where the storage of within XML documents provides a framework for Web-based control of media content. Additional details regarding use of stored XML documents for Web-based control of media content are disclosed in commonly-assigned, copending U.S. patent application Ser. No. 09/461,191, filed Dec. 15, 1999, now pending entitled "Apparatus and Method for Providing Server State and Attribute Management for Voice Enabled Web Applications", the disclosure of which is incorporated in its entirety herein by reference.

Figure 6A:
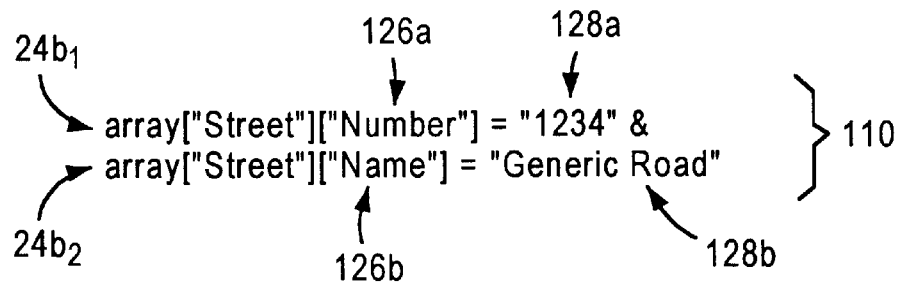
FIGS. 6A and 6B are diagrams illustrating a multiple-depth array and the corresponding generated string, respectively.
Figure 6B:
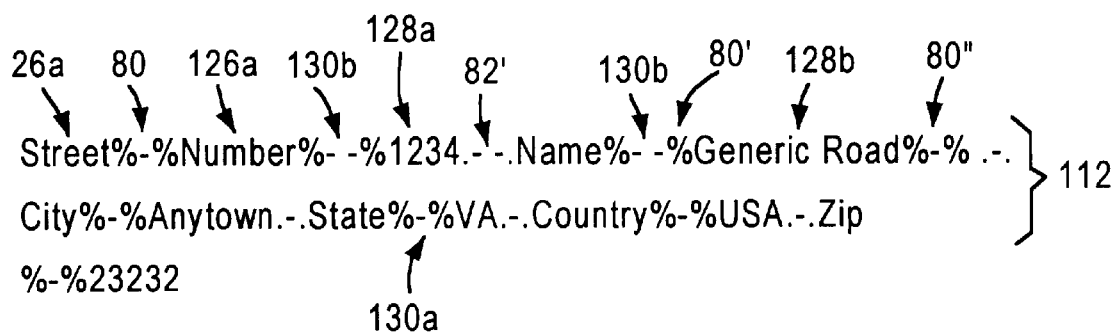

FIGS. 6A and 6B are diagrams illustrating a multiple-depth array 110 and a string 112 generated by the storage interface process 32 for representation of the multiple depth array 110 according to an embodiment of the present invention. The multiple-depth array 110 illustrates the scenario where the array element 24b is subdivided into subelements $24b_1$ and $24b_2$. In particular, the subelement $24b_1$, includes a subelement name 126a (e.g., "Number") and a subelement value 128a (e.g., "1234"), and the subelement $24b_2$ includes a subelement name 126b (e.g., "Name") and a subelement value 128b (e.g., "Generic Road"), enabling a search process to uniquely search using the subelement names 126 as a search key. Hence, the multi-depth array 110 illustrates that the top level array element 24b may include subelements (e.g., $24b_1$ and $24b_2$), resulting in a more complex data structure.

The storage interface 32 is configured for specifying the depth of the array element by adding a depth indicator 130 that specifies the depth of the corresponding array element. For example, the depth indicator 130a includes a single dash ("-") that specifies a level one element, for example the array element 24d. The depth indicator 130b includes two dashes ("- -") that specify a level two element, for example the subelements 24$b_1$ and 24$b_2$. Hence, the array descriptors 80 and 82 generated by the storage interface process 32 include depth indicators 130 that specify the respective depth of the array elements, where the array descriptors 80 and 82 specify a level one element, and the array descriptors 80' and 82' specify a level two element. Note that a final array descriptor 80" may be used to specify the end of the lower depth element.

Figure 4B:
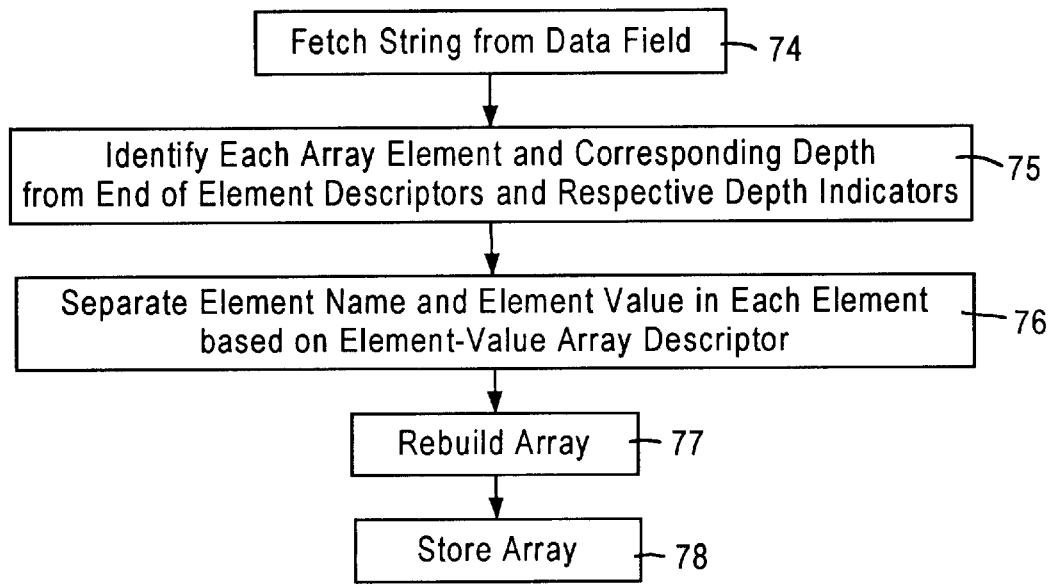

FIG. 4B is a diagram illustrating the method by the retrieval process 36 of regenerating the array 22 based on the string 100 stored in the data field 16b. The retrieval processes 36 parses the XML document 10' and fetches the string 100 from the data field in step 74. The retrieval process 36 then identifies each array element 24 and its corresponding depth in step 75 based on the end of element descriptors 82 and the respective depth indicators 130. For example, the retrieval process 36 identifies the array element 24$b_1$ by locating the end of element descriptor 82' following the element value 128a ("1234"); the retrieval process 36 determines the depth of the array element 24$b_1$ based on the depth indicators within the end of element descriptor 82'. Although the retrieval process 36 can identify the array element 24$b_2$ as a sub element of multiple depth array 110 implicitly by the next end of element descriptor having a higher order depth indicator, the retrieval process 36 may also identify the structure of the multiple depth array explicitly by the depth indicator within the element-value array descriptor 130b.

The retrieval process 36 then separates in step 76 the element name and element value in each element 24 based on the corresponding element-value array descriptor (e.g., 130b). The retrieval process 36 then rebuilds the array and step 77, and stores the array or outputs the array to the servers 40 or 42 in step 78.

Hence, the storage interface 32 is able to generate a string that includes array descriptors that specify the data structure of the array, enabling the array to be stored within a single field according to a prescribed storage definitions, without loss of the data structure of the array, and without modification of the storage definitions for the storage medium. Since arrays can be stored in databases as a single entry, there is less dependency of an application 40 or 42 accessing the array 20 based on the run-time speed of the database 46 or 50. Hence, the disclosed embodiment is particularly beneficial for arrays that change in size or definition, for which database attributes may be difficult to define.

It should be noted that various modifications may be made to the disclosed embodiment, and that the invention is not limited to storage within the disclosed storage media. Furthermore, the specific designations for the array descriptors are by way of illustration: any type of descriptors can be used that are uniquely identifiable by the system generating the string and regenerating the array from the string.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a executable system configured for storing information onto a tangible medium according to a prescribed storage definition, the method comprising:

generating a string based on an array, having a prescribed data structure and having the information stored in the array according to the prescribed data structure, by including within the string the information and array descriptors that specify the prescribed data structure; and storing the string into a data field on the tangible medium according to the prescribed storage definition.

2. The method of claim 1, wherein the storing step includes storing the string into the data field defined by the prescribed storage definition for a database stored on the tangible medium.

3. The method of claim 1, wherein the storing step includes storing the string into the data field in an extensible markup language (XML) document having an XML tag that specifies the prescribed storage definition.

4. The method of claim 3, wherein the generating step includes:

identifying, for each array element in the array, an element name and a corresponding element value;

inserting, for each said element name and the corresponding element value, a first array descriptor for distinguishing said each element name and the corresponding element value; and inserting a second array descriptor for separating each of the array elements.

5. The method of claim 4, wherein the step of inserting a first array descriptor includes inserting the first array descriptor between the corresponding element name and the corresponding element value.

6. The method of claim 5, wherein the step of inserting the second array descriptor includes inserting a corresponding one of the second array descriptors between each of the array elements.

7. The method of claim 6, wherein each said array element has a prescribed depth in the array, the step of inserting a first array descriptor including generating within the first array descriptor a first depth indicator that specifies the corresponding prescribed depth.

8. The method of claim 7, wherein the step of inserting a second array descriptor includes generating within the second array descriptor a second depth indicator that specifies the corresponding prescribed depth of a subsequent one of the array elements.

9. The method of claim 8, further comprising regenerating the array based on the string stored in the data field.

10. The method of claim 1, wherein the generating step includes:

identifying, for each array element in the array, an element name and a corresponding element value;

inserting, for each said element name and the corresponding element value, a first array descriptor for distinguishing said each element name and the corresponding element value; and inserting a second array descriptor for separating each of the array elements.

11. The method of claim 10, wherein the step of inserting a first array descriptor includes inserting the first array descriptor between the corresponding element name and the corresponding element value.

12. The method of claim 11, wherein the step of inserting the second array descriptor includes inserting a corresponding one of the second array descriptors between each of the array elements.

13. The method of claim 10, wherein each said array element has a prescribed depth in the array, the step of inserting a first array descriptor including generating within the first array descriptor a first depth indicator that specifies the corresponding prescribed depth.

14. The method of claim 13, wherein the step of inserting a second array descriptor includes generating within the second array descriptor a second depth indicator that specifies the corresponding prescribed depth of a subsequent one of the array elements.

15. The method of claim 1, further comprising regenerating the array based on the string stored in the data field.

16. A computer readable medium having stored thereon sequences of instructions for storing information onto a tangible medium according to a prescribed storage definition, the sequences of instructions including instructions for performing the steps of:

generating a string based on an array, having a prescribed data structure and having the information stored in the array according to the prescribed data structure, by including within the string the information and array descriptors that specify the prescribed data structure; and storing the string into a data field on the tangible medium according to the prescribed storage definition.

17. The medium of claim 16, wherein the storing step includes storing the string into the data field defined by the prescribed storage definition for a database stored on the tangible medium.

18. The medium of claim 16, wherein the storing step includes storing the string into the data field in an extensible markup language (XML) document having an XML tag that specifies the prescribed storage definition.

19. The medium of claim 18, wherein the generating step includes:

identifying, for each array element in the array, an element name and a corresponding element value;

inserting, for each said element name and the corresponding element value, a first array descriptor for distinguishing said each element name and the corresponding element value; and inserting a second array descriptor for separating each of the array elements.

20. The medium of claim 19, wherein the step of inserting a first array descriptor includes inserting the first array descriptor between the corresponding element name and the corresponding element value.

21. The medium of claim 20, wherein the step of inserting the second array descriptor includes inserting a corresponding one of the second array descriptors between each of the array elements.

22. The medium of claim 21, wherein each said array element has a prescribed depth in the array, the step of inserting a first array descriptor including generating within the first array descriptor a first depth indicator that specifies the corresponding prescribed depth.

23. The medium of claim 22, wherein the step of inserting a second array descriptor includes generating within the second array descriptor a second depth indicator that specifies the corresponding prescribed depth of a subsequent one of the array elements.

24. The medium of claim 23, further comprising instructions for performing the step of regenerating the array based on the string stored in the data field.

25. The medium of claim 16, wherein the generating step includes:

identifying, for each array element in the array, an element name and a corresponding element value;

inserting, for each said element name and the corresponding element value, a first array descriptor for distinguishing said each element name and the corresponding element value; and inserting a second array descriptor for separating each of the array elements.

26. The medium of claim 25, wherein the step of inserting a first array descriptor includes inserting the first array descriptor between the corresponding element name and the corresponding element value.

27. The medium of claim 26, wherein the step of inserting the second array descriptor includes inserting a corresponding one of the second array descriptors between each of the array elements.

28. The medium of claim 25, wherein each said array element has a prescribed depth in the array, the step of inserting a first array descriptor including generating within the first array descriptor a first depth indicator that specifies the corresponding prescribed depth.

29. The medium of claim 28, wherein the step of inserting a second array descriptor includes generating within the second array descriptor a second depth indicator that specifies the corresponding prescribed depth of a subsequent one of the array elements.

30. The medium of claim 16, further comprising instructions for performing the step of regenerating the array based on the string stored in the data field.

31. A processor-based system configured for storing information onto a tangible medium according to a prescribed storage definition, the system comprising:

a storage interface process configured for converting an array, having a prescribed data structure and information stored according to the prescribed data structure, into a string including the information and array descriptors that specify the prescribed data structure; and a storage process configured for storing the string into a data field on the tangible medium according to the prescribed storage definition.

32. The system of claim 31, wherein the storage interface process is configured for identifying, for each array element in the array, an element name and a corresponding element value, the storage interface process configured for inserting, for each said element name and the corresponding element value, a first of the array descriptors for distinguishing said each element name and the corresponding element value.

33. The system of claim 32, wherein the storage interface process is configured for inserting a second of the array descriptors for separating each of the array elements.

34. The system of claim 33, wherein each said array element has a prescribed depth in the array, the storage interface process configured for inserting within each said first of the array descriptors a first depth indicator that specifies the corresponding prescribed depth.

35. The system of claim 34, wherein the storage interface process is configured for inserting within each said second of the array descriptors a second depth indicator that specifies the corresponding prescribed depth of a subsequent one of the array elements.

36. The system of claim 31, further comprising an array retrieval process configured for regenerating the array based on the string stored in the data field.

37. A method in an executable system configured for generating an array from a string stored on a tangible medium according to a prescribed storage definition, the method comprising:

determining a structure of the array based on array descriptors within the string; and generating the array based on array information within the string and the determined structure of the array.

38. The method of claim 37, wherein the determining step includes identifying array elements based on first array descriptors located at prescribed locations within the string for separating each of the array elements.

39. The method of claim 38, wherein the determining step further includes identifying for each array element a corresponding depth based on depth information within a corresponding one of the first array descriptors.

40. The method of claim 39, wherein the determining step further includes identifying for each said array element and element name and a corresponding element value based on a corresponding second array descriptor located within the string for separating the element name and the element value.

41. A computer readable medium having stored thereon sequences of instructions for generating an array from a string stored on a tangible medium according to a prescribed storage definition, the sequences of instructions including instructions for performing the steps of:

determining a structure of the array based on array descriptors within the string; and generating the array based on array information within the string and the determined structure of the array.

42. The medium of claim 41, wherein the determining step includes identifying array elements based on first array descriptors located at prescribed locations within the string for separating each of the array elements.

43. The medium of claim 42, wherein the determining step further includes identifying for each array element a corresponding depth based on depth information within a corresponding one of the first array descriptors.

44. The medium of claim 43, wherein the determining step further includes identifying for each said array element and element name and a corresponding element value based on a corresponding second array descriptor located within the string for separating the element name and the element value.

* * * * *